(12) United States Patent
Tsypkaykin et al.

(10) Patent No.: US 11,624,282 B2
(45) Date of Patent: Apr. 11, 2023

(54) BLADE FOR A TURBO MACHINE, BLADE ASSEMBLY, AND TURBINE

(71) Applicant: DOOSAN ENERBILITY CO., LTD., Changwon (KR)

(72) Inventors: Igor Tsypkaykin, Baden (CH); Stefan Emanuel Martin, Baden (CH); Wade Beaumont, Baden (CH); Joerg Krueckels, Baden (CH); Willy H Hoffmann, Baden (CH)

(73) Assignee: DOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/847,743

(22) Filed: Jun. 23, 2022

(65) Prior Publication Data
US 2023/0003128 A1  Jan. 5, 2023

(30) Foreign Application Priority Data
Jul. 1, 2021  (EP) .................................... 21183176

(51) Int. Cl.
*F01D 5/22* (2006.01)
*F01D 5/26* (2006.01)
*F01D 5/14* (2006.01)

(52) U.S. Cl.
CPC ............ *F01D 5/145* (2013.01); *F01D 5/225* (2013.01); *F05D 2220/30* (2013.01); *F05D 2240/30* (2013.01)

(58) Field of Classification Search
CPC .................................. F01D 5/225; F01D 5/26
See application file for complete search history.

(56) References Cited

U.S. PATENT DOCUMENTS

| | | | |
|---|---|---|---|
| 2011/0142650 A1* | 6/2011 | Beeck | F04D 29/668 416/179 |
| 2011/0194939 A1* | 8/2011 | Marra | F01D 5/26 29/889.21 |
| 2014/0056716 A1* | 2/2014 | Messmann | B22D 19/0081 416/212 R |
| 2017/0058681 A1* | 3/2017 | Martin, Jr. | F01D 5/225 |
| 2020/0032659 A1* | 1/2020 | Zhou | F01D 5/24 |
| 2021/0285330 A1* | 9/2021 | Hart | F01D 5/187 |

\* cited by examiner

*Primary Examiner* — Long T Tran
(74) *Attorney, Agent, or Firm* — Harvest IP Law LLP

(57) ABSTRACT

A blade for a turbo machine is provided. The blade for a turbo machine includes an airfoil body extending in a radial direction and including a suction side surface and a pressure side surface opposite to the suction side surface with respect to a circumferential direction extending across the radial direction, and a snubber structure including a first snubber element protruding in the circumferential direction from the suction side surface of the airfoil body and a second snubber element protruding in the circumferential direction from the pressure side surface of the airfoil body, wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius.

20 Claims, 6 Drawing Sheets

BLADE FOR A TURBO MACHINE, BLADE ASSEMBLY, AND TURBINE

CROSS REFERENCE TO RELATED APPLICATION

This application claims priority to European Patent Application No. 21183176.3, filed on Jul. 1, 2021, the disclosure of which is incorporated herein by reference in its entirety.

BACKGROUND

1. Field

Apparatuses and methods consistent with exemplary embodiments relate to a blade for a turbo machine including a gas turbine and a steam turbine, a blade assembly, and a turbine.

2. Description of the Related Art

In a turbo machine such as a steam turbine or a gas turbine, a plurality of blades are coupled to a rotor disk. The blades are exposed to and cooperate with a working fluid (e.g., air or steam). The working fluid flows between the blades, exerting work on the blades in a turbine section of the turbo machine or receiving work from the blades in a compressor section of the turbo machine. Therefore, the blades have to withstand high mechanical loads.

To limit vibrational stresses, the blades are provided with snubber structures. The snubber structures include snubber elements protruding from a suction side and a pressure side of each blade at the same radial position. Thereby, when the blades are rotated with the disk, adjacent ends of the snubber elements come into contact and form a cooperative structure between the blades to reduce vibrational stress.

U.S. Pat. No. 8,540,488 B2 discloses a rotor for a turbo machine comprising a plurality of blades and a damping structure extending between adjacent blades. The damping structure includes a snubber element protruding from a suction side of a first blade towards a second blade, wherein an end of the snubber element is positioned adjacent to a cooperating surface provided on a small protrusion on a pressure side of the second blade.

U.S. Pat. No. 8,523,525 B2 discloses a turbine blade comprising a snubber assembly that includes first and second snubber elements protruding from opposite suction and pressure side surfaces of the blade, wherein each snubber element abuts a filet integrally formed with respective suction and pressure side surface.

Although snubber structures help to reduce vibrational stress in the blades, aerodynamic losses may occur because the snubber structures protrude from the aerodynamic surfaces of the blades that define the pressure side and the suction side.

SUMMARY

Aspects of one or more exemplary embodiments provide improved solutions for snubber structures of a blade for a turbo machine, in particular, snubber structures which cause less aerodynamic losses.

Additional aspects will be set forth in part in the description which follows and, in part, will become apparent from the description, or may be learned by practice of the exemplary embodiments.

According to an aspect of an exemplary embodiment, there is provided a blade for a turbo machine including: an airfoil body extending in a radial direction and including a suction side surface and a pressure side surface opposite to the suction side surface with respect to a circumferential direction extending across the radial direction; and a snubber structure including a first snubber element protruding in the circumferential direction from the suction side surface of the airfoil body and a second snubber element protruding in the circumferential direction from the pressure side surface of the airfoil body. The first snubber element may be connected to the suction side surface of the airfoil body by a concave curved first transition portion having a first radius, and the second snubber element may be connected to the pressure side surface of the airfoil body by a concave curved second transition portion having a second radius, the first radius being smaller than the second radius.

The first snubber element may protrude from the suction side surface by a first length, and the second snubber element may protrude from the pressure side surface by a second length, and the first length may be smaller than the second length.

The first snubber element may include a first contact surface that faces away from the suction side surface and extends along an axial direction, the axial direction running transverse to the radial direction and the circumferential direction. The second snubber element may include a second contact surface that faces away from the pressure side surface and extends along the axial direction. The first length and the second length may be measured along a connection line that connects a center position of the first contact surface with respect to the axial direction and a center position of the second contact surface with respect to the axial direction.

Each of the first and second contact surfaces may extend at least partially inclined with respect to the axial direction.

A ratio of the first length to the second length may be in a range between 0.7 and 0.9.

A ratio of the first radius to the second radius may be in a range between 0.2 and 0.8.

The snubber structure and the airfoil body may be integrally formed.

According to an aspect of another exemplary embodiment, there is provided a blade assembly including: a plurality of blades; and a rotor disk to which the plurality of blades are coupled, wherein each of the plurality of blades may include: an airfoil body extending in a radial direction and including a suction side surface and a pressure side surface opposite to the suction side surface with respect to a circumferential direction extending across the radial direction; and a snubber structure including a first snubber element protruding in the circumferential direction from the suction side surface of the airfoil body and a second snubber element protruding in the circumferential direction from the pressure side surface of the airfoil body, wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius, wherein the first snubber element includes a first contact surface facing away from the suction side surface, and the second snubber element includes a second contact surface facing away from the pressure side surface, and wherein the first contact surface faces the second contact surface.

According to an aspect of another exemplary embodiment, there is provided a turbine including: a blade assembly including a plurality of blades and a rotor disk to which the plurality of blades are coupled, wherein each of the plurality of blades may include: an airfoil body extending in a radial direction and including a suction side surface and a pressure side surface opposite to the suction side surface with respect to a circumferential direction extending across the radial direction; and a snubber structure including a first snubber element protruding in the circumferential direction from the suction side surface of the airfoil body and a second snubber element protruding in the circumferential direction from the pressure side surface of the airfoil body, wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius, wherein the first snubber element includes a first contact surface facing away from the suction side surface, and the second snubber element includes a second contact surface facing away from the pressure side surface, and wherein the first contact surface faces the second contact surface.

For example, the pressure side surface and the suction side surface define a cross-section of the airfoil body and define an aerodynamic profile configured to generate a lift force directed from the pressure side surface towards the suction side surface, when a fluid flows along the pressure side and suction side surfaces from a leading edge towards a trailing edge of the airfoil body.

The snubber elements may be realized as fins protruding from the respective suction side and pressure side surfaces along a circumferential direction extending across the radial and the axial direction. Further, the snubber elements may have a certain width along the axial direction, wherein the width along the axial direction is less than a width of the airfoil body between the front and the aft end. The snubber elements extend along the circumferential direction and, thus, extend substantially perpendicular to the radial direction. To avoid a sharp edge or corner between the pressure and suction side surfaces and the snubber element, a smooth, concave curved transition portion is provided that connects each pressure or suction side surface and the corresponding snubber element and defines a predefined radius.

According to one or more exemplary embodiments, the snubber elements on the suction side surface and the pressure side surface of the airfoil body of the blade are implemented with different dimensions. For example, a transition from the suction side surface to the first snubber element is realized with a smaller radius or a sharper edge than a transition from the pressure side surface to the second snubber element.

According to one or more exemplary embodiments, aerodynamic losses are reduced because the first radius of the first transition portion that connects the suction side surface and the first snubber element is smaller than the second radius of the second transition portion that connects the pressure side surface and the second snubber element. If a plurality of blades are arranged adjacent along the circumferential direction, first and second snubber elements of adjacent blades are arranged adjacent to each other. Due to the decreased radius of the first transition portion, a loss mechanism to which separated flow travels along the snubber elements from the pressure side of one blade to the suction side of an adjacent blade and generates vortices with shear layers at the first transition portion or region between the suction side surface and each first snubber element is significantly reduced.

According to one or more exemplary embodiments, the first snubber element protrudes from the suction side surface by a first length, and the second snubber element protrudes from the pressure side surface by a second length, the first length being smaller than the second length. Thus, the first and the second snubber elements are asymmetric with regard to the circumferential direction. This further helps to reduce the impact of the loss mechanism described above. Further, the mechanical stress levels can be more uniformly distributed by reducing the length of the first or suction side snubber element in addition to making the first radius smaller than the second radius.

According to one or more exemplary embodiments, each of the first and second contact surfaces extends at least partially inclined with respect to the axial direction. This definitely facilitates the assembly of the blades. For example, each of the contact surfaces may have a section extending inclined with respect to the axial direction. Optionally, the contact surface may further have at least one portion extending along or parallel to the axial direction.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
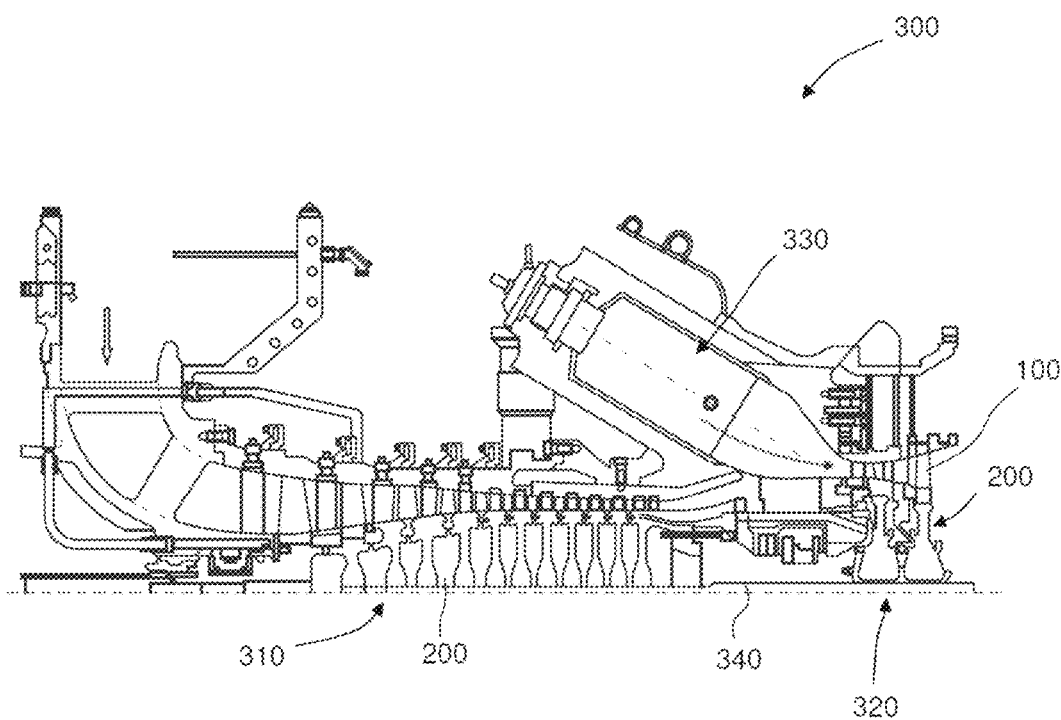
FIG. 1 is a schematic cross-sectional view of a gas turbine according to an exemplary embodiment.

Various changes and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and technical scope disclosed herein.

The terminology used herein is for the purpose of describing specific embodiments only, and is not intended to limit the scope of the disclosure. The singular expressions "a", "an", and "the" may include the plural expressions as well, unless the context clearly indicates otherwise. In the disclosure, the terms such as "comprise", "include", "have/has" should be construed as designating that there are such features, integers, steps, operations, components, parts, and/or combinations thereof, not to exclude the presence or possibility of adding one or more other features, integers, steps, operations, components, parts and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, some components in the accompanying drawings are exaggerated, omitted, or schematically illustrated.

FIG. 1 is a schematic cross-sectional view of a gas turbine 300 according to an exemplary embodiment. Referring to FIG. 1, the gas turbine 300 includes a compressor section 310 configured to rotate about a rotational axis to compress a working fluid, a turbine section 320 configured to be rotated about the rotational axis by expanding the working fluid, and a combustion chamber 330 configured to combust fuel with the working fluid. The turbine section 320 is kinematically coupled to the compressor section 310 to rotate the compressor section 310. The compressor section 310 and the turbine section 320 each include a plurality of blade assemblies 200 that may be mounted to a common central shaft 340. Each blade assembly 200 includes a plurality of blades 100 extending in a radial direction R1 and comprising an aerodynamic surface. The working principle of the gas turbine 300 is well known to a person skilled in the art and, therefore, a detailed description thereof will be omitted herein.

Figure 2:
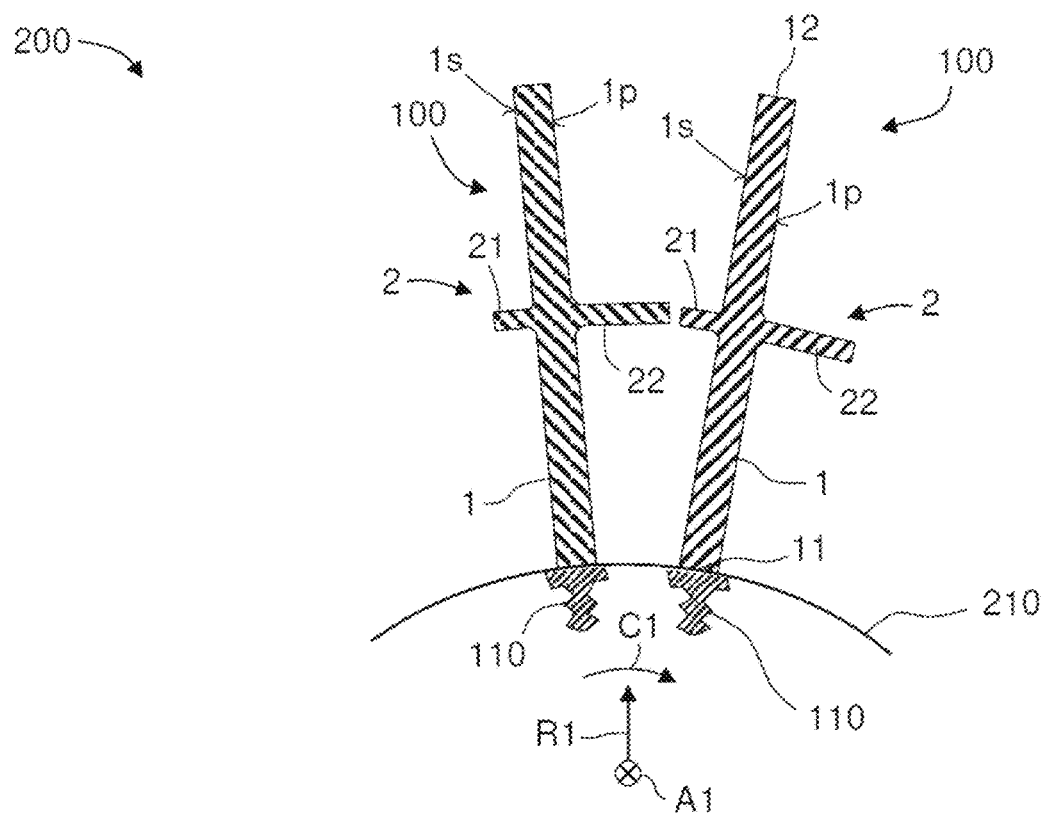
FIG. 2 is a schematic partial cross-sectional view of a blade assembly according to an exemplary embodiment.

FIG. 2 is a schematic partial cross-sectional view of a blade assembly 200 of the gas turbine 300. Referring to FIG. 2, the blade assembly 200 includes a plurality of blades 100 and a rotor disk 210 to which the plurality of turbine blades 100 are coupled. The rotor disk 210 functions as a carrier of the blades 210 and may be fixed to the central shaft 340 of the gas turbine 300. Each blade 100 may include a coupling interface 110 in the form of a firtree shaped root that is coupled or fixed to the rotor disk 210. For example, the root may be inserted in a complementary shaped recess in the rotor disk 210. Here, the blades 100 are arranged adjacent to each other in a circumferential direction C1. The blade assembly 200 may form part of the turbine section 320 of the gas turbine 300.

Figure 3:
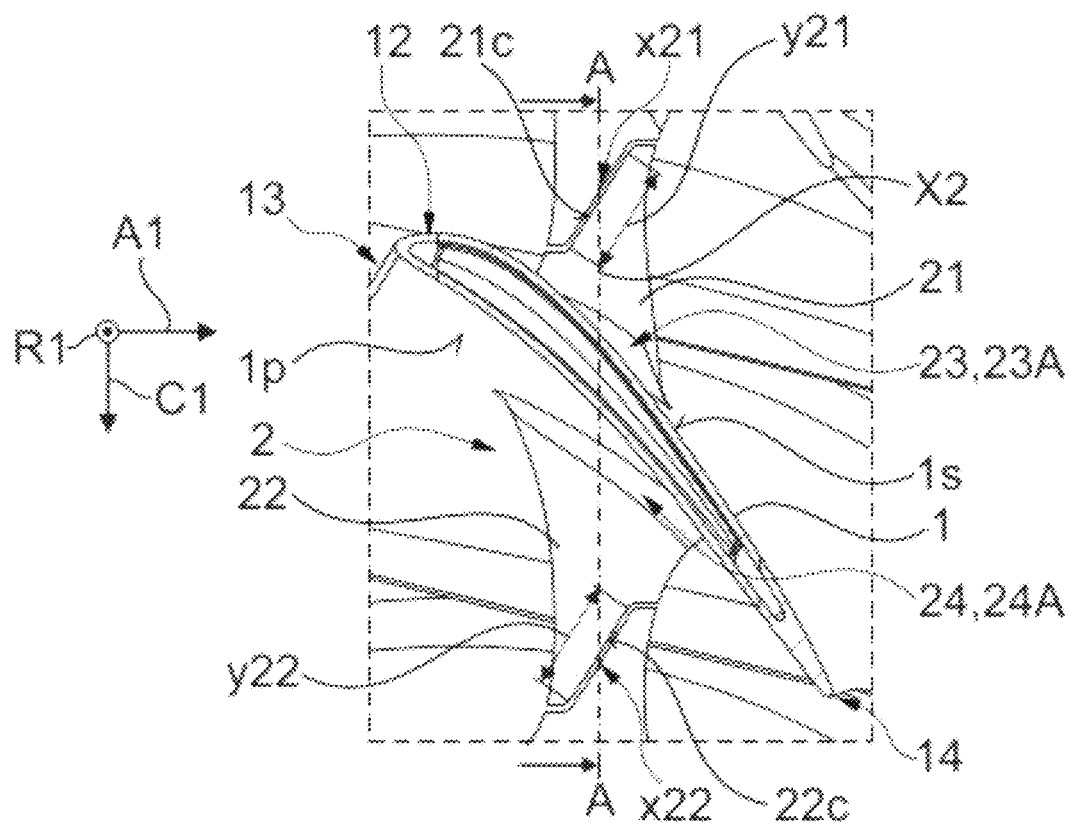
FIG. 3 is a top view of a blade for a turbo machine according to an exemplary embodiment.

FIG. 3 is a top view of the blade 100. Referring to FIGS. 2 and 3, the blade 100 comprises an airfoil body 1 and a snubber structure 2. The airfoil body 1 extends along the radial direction R1 between a root end 11 and a tip end 12. Also, the airfoil body 1 extends between a front or leading end 13 and an aft or trailing end 14 with respect to an axial direction A1. The axial direction A1 extends transverse to the radial direction R1, and the circumferential direction C1 extends transverse to the axial direction A1 and the radial direction R1. The blade 100 further includes a suction side surface 1s and a pressure side surface 1p opposite to the suction side surface 1s. The suction side surface 1s and the pressure side surface 1p respectively extend between the front end 13 and the aft end 14 of the airfoil body 1 and, together define a cross-section of the airfoil body 1.

Figure 4:
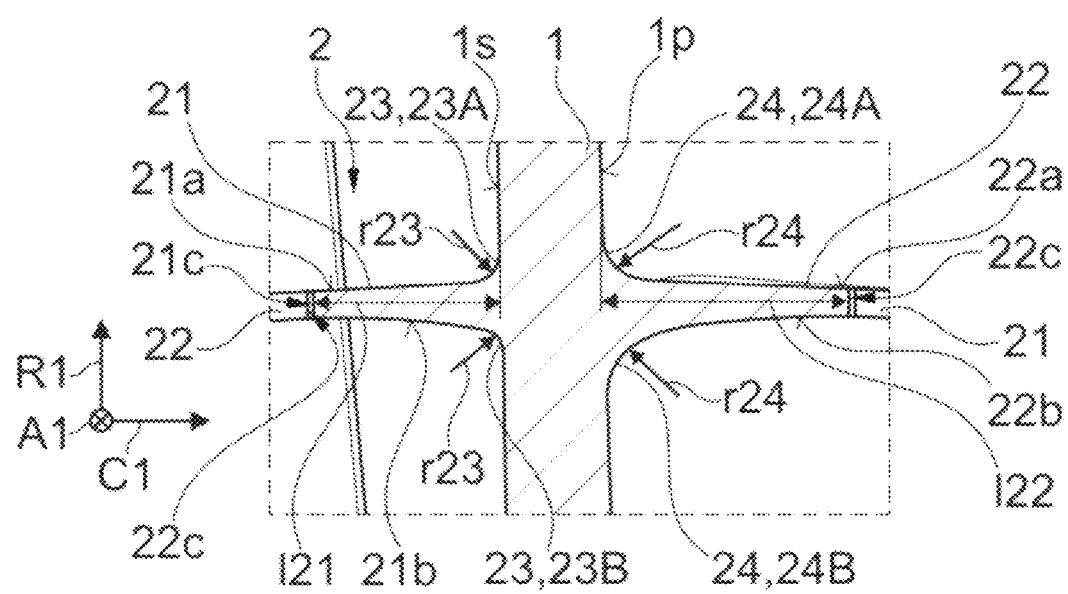
FIG. 4 is a cross-sectional view taken along line A-A of FIG. 3.

The snubber structure 2 of the blade 100 includes a first snubber element 21 and a second snubber element 22. FIG. 4 shows the blade 100 in a cross-sectional view taken along line A-A of FIG. 3. Referring to FIGS. 2 to 4, the first snubber element 21 protrudes from the suction side surface 1s of the airfoil body 1 with regard to the circumferential direction C1. For example, the first snubber element 21 may be realized in the form of a longitudinal fin. The first snubber element 21 with an inner end is coupled to the suction side surface 1s of the airfoil body 1 and an opposite outer end faces away from the suction side surface 1s of the airfoil body 1. At the outer end of the first snubber element 21, a first contact surface 21c may be provided which may optionally extend inclined with respect to the axial direction A1, as shown in FIG. 3. The first contact surface 21c faces in a direction away from the suction side surface 1s and extends at least partially along the axial direction A1. For example, the first contact surface 21c may include a middle portion that extends inclined with respect to the axial direction A1 of a predefined length y21, and the middle portion is provided to contact a middle portion of a second contact surface 22c of the second snubber element 22 of an adjacent blade 100. Further, the contact surface may include end portions extending along or substantially parallel to the axial direction A1 at opposite ends of the middle portion.

The first snubber element 21 in the region of the inner end is connected to the suction side surface 1s of the airfoil body 1 by a first transition portion 23. Referring to FIG. 4, the first transition portion 23 defines a concave curved surface. The first transition portion 23 forms a continuous connection between the suction side surface 1s and a surface of the first snubber element 21. For example, an upper first transition portion 23A may be provided which forms a concave curved connection between the suction side surface 1s and an upper surface 21a of the first snubber element 21, wherein the upper surface 21a of the first snubber element 21 faces the tip end 12 of the airfoil body 1 with respect to the radial direction R1. Also, a lower first transition portion 23B may be provided which forms a concave curved connection between the suction side surface 1s and a lower surface 21b of the first snubber element 21, wherein the lower surface 21b of the first snubber element 21 faces the root end 11 of the airfoil body 1 with respect to the radial direction R1. The first transition portion 23 may have a first radius r23. The first radius r23 of the upper and lower first transition portions 23A and 23B may be the same.

The first snubber element 21 and the airfoil body 1 are preferably integrally formed as one single piece.

The second snubber element 22 protrudes from the pressure side surface 1p of the airfoil body 1 with regard to the circumferential direction C1. Referring to FIGS. 3 and 4, the second snubber element 22 may be realized in the form of a longitudinal fin. The second snubber element 22 with an inner end is coupled to the pressure side surface 1p of the airfoil body 1 and an opposite outer end faces away from the pressure side surface 1p of the airfoil body 1. At the outer end of the second snubber element 22, a second contact surface 22c may be provided which may optionally extend inclined with respect to the axial direction A1, as shown in FIG. 3. The second contact surface 22c faces in a direction away from the pressure side surface 1p and extends at least partially along the axial direction A1. For example, the second contact surface 22c may include a middle portion of a predefined length y22 that extends inclined with respect to the axial direction A1, and the middle portion is provided to contact the middle portion of the first contact surface 21c of the first snubber element 21 of an adjacent blade 100. Further, the second contact surface 22c may include end portions extending along or substantially parallel to the axial direction A1 at opposite ends of the middle portion. here, the first and second contact surfaces 21c, 22c of the first and second snubber elements 21, 22 of blades 100 arranged adjacent in the circumferential direction C1 face each other. In a state in which the blades 100 are not rotated with the disk 210, that is, in a stationary state, a small gap is formed between the opposing first and second contact surfaces 21c and 22c. When the blades 100 are rotated with the disk 210, the opposed first and second contact surfaces 21c, 22c, in particular, the middle portions of the first and second contact surfaces 21c, 22c come into contact with each other.

The second snubber element 22 in the region of the inner end is connected to the pressure side surface 1p of the airfoil body 1 by a second transition portion 24. Referring to FIG. 4, the second transition portion 24 defines a concave curved surface. The second transition portion 24 forms a continuous connection between the pressure side surface 1p and a surface of the second snubber element 22. For example, an upper second transition portion 24A may be provided which forms a concave curved connection between the pressure side surface 1p and an upper surface 22a of the second snubber element 22, wherein the upper surface 22a of the second snubber element 22 faces the tip end 12 of the airfoil body 1 with respect to the radial direction R1. Further, a lower second transition portion 24B may be provided which forms a concave curved connection between the pressure side surface 1p and a lower surface 22b of the second snubber element 22, wherein the lower surface 22b of the second snubber element 22 faces the root end 11 of the airfoil body 1 with respect to the radial direction R1. The second transition portion 24 may have a second radius r24. The second radius r24 of the upper and lower second transition portions 24A, 24B may be the same. The second snubber element 22 and the airfoil body 1 are preferably integrally formed as one single piece.

As shown in FIG. 4, the first radius r23 of the first transition portion 23 is smaller than the second radius r24 of the second transition portion 24. Hence, on the suction side surface 1s, the transition or connection between the suction side surface 1s and the surface of the first snubber element 21 is realized sharper compared to the transition or connection between the pressure side surface 1p and the second snubber element 22. Thereby, the inner end or transition portion 23 of the first snubber element 21 has a smaller width in the radial direction R1 than the inner end or transition portion 24 of the second snubber element 22. For example, a ratio of the first radius r23 to the second radius r24, i.e., a ratio r23/r24, may be in a range between 0.2 and 0.8.

Figure 5:
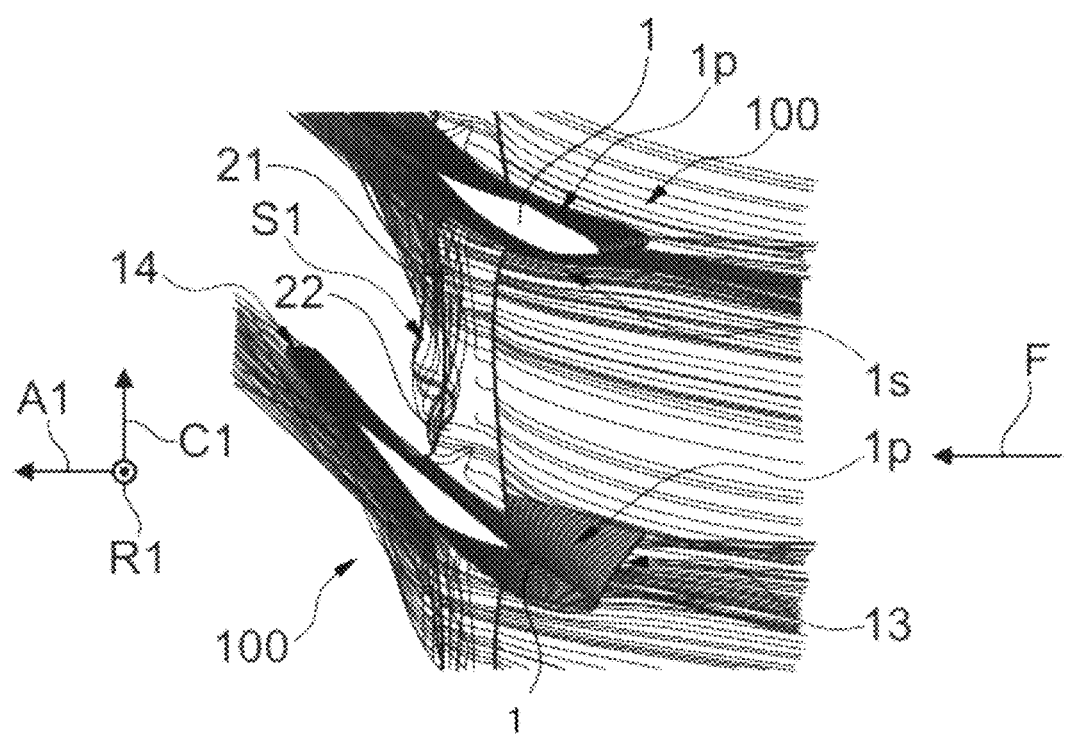
FIG. 5 is a result of a flow simulation in a top view to a blade assembly of a comparative example.
Figure 6:
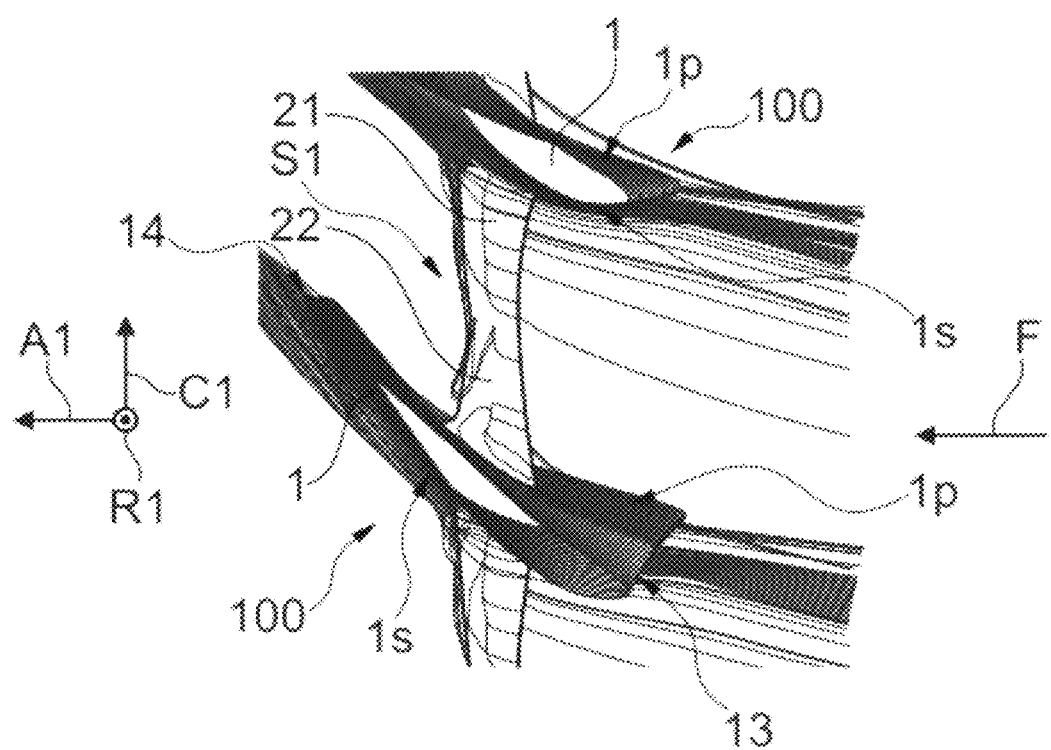
FIG. 6 is a result of a flow simulation in a top view to a blade assembly according to an exemplary embodiment.

FIGS. 5 and 6 show results of a flow simulation in a top view to two blades 100 arranged adjacent to each other in the circumferential direction C1. Here, the blades 100 are subject to a fluid flow flowing in a main flow direction F. Because the main flow direction F is substantially parallel to the axial direction A1, the fluid flows along the pressure side surfaces 1p and the suction side surfaces 1s from the front end 13 to the aft end 14 of the airfoil bodies 1. The flow conditions are identical in FIGS. 5 and 6.

Referring to FIG. 5, the snubber elements 21, 22 of the blades 100 are respectively connected to the airfoil body 1 by transition portions 23, 24 having the same radius r23, r24 on both the suction side surface 1s and the pressure side surface 1p. Here, a remarkable flow S1 of separated fluid occurs along the snubber elements 21, 22 from the pressure side surface 1p of one blade 100 towards the suction side surface 1s of the adjacent blade 100. This cross-flow S1 forms vortices that cause losses together with shear layers resulting from the transition portion 23 on the suction side surface 1s of the adjacent blade 100.

In contrast to the configuration of the blades 100 shown in FIG. 5, the blades 100 shown in FIG. 6 are embodied as described with reference to FIGS. 2 to 4, wherein the first snubber element 21 is connected to the suction side surface 1s of the airfoil body 1 by the concave curved first transition portion 23 having a first radius r23, and the second snubber element 22 is connected to the pressure side surface 1p of the airfoil body 1 by the concave curved second transition portion 24 having a second radius r24, the first radius r23 being smaller than the second radius r24. Referring to FIG. 6, the cross-flow along the snubber elements 21, 22 from the pressure side surface 1p of one blade 100 towards the suction side surface 1s of the adjacent blade 100 is significantly reduced. Therefore, generation of vortices and, consequently, losses are also reduced.

Referring back to FIG. 2, the second snubber element 22 may protrude further from the pressure side surface 1p than the first snubber element 21 protrudes from the suction side surface 1s. This configuration is shown in more detail in FIGS. 3 and 4. As shown in FIG. 4, the first snubber element 21 may protrude from the suction side surface 1s by a first length 121, and the second snubber element 22 may protrude from the pressure side surface 1p by a second length 122, the first length 121 being smaller than the second length 122. The first length 121 and the second length 122 are to be understood as an extension of the respective snubber element 21, 22 with respect to the circumferential direction C1. For example, the first length 121 and the second length 122 may be measured along a line X2 illustrated in FIG. 3. The line X2 connects a center position x21 of the first contact surface 21c with regard to the axial direction A1 and a center position x22 of the second contact surface 22c with regard to the axial direction A1. For example, the center position x21 of the first contact surface 21c may be defined as the center of the middle section or the middle of the length y21 of the middle section of the first contact surface 21c. In the same way, the center position x22 of the second contact surface 22c may be defined as the center of the middle section or the middle of the length y22 of the middle section of the second contact surface 22c, as shown in FIG. 3. A ratio of the first length 121 to the second length 121, i.e., the ratio 121/122 may be in a range between 0.7 and 0.9. Because the inner end or transition portion 23 of the first snubber element 21 has a smaller width in the radial direction R1 than the inner end or transition portion 24 of the second snubber element 22, reducing the length 121 of the first snubber element 21 advantageously reduces the stress level in the first transition portion 23.

Referring to FIG. 2, the first and second snubber elements 21, 22 of adjacent blades 100 extend towards each other in the circumferential direction C1, wherein each first contact surface 21c faces one second contact surface 22c. Here, a small gap is present between the first and second contact surfaces 21c, 22c in a stationary state of the blade assembly 200. Thus, the first and second snubber elements 21, 22, and the gap between the contact surfaces 21c, 22c having a predefined width together corresponds to the distance between the adjacent blades 100 with regard to the circumferential direction C1. Accordingly, the amount by which the length 121 of the first snubber element 21 is reduced corresponds to the amount by which the length 122 of the second snubber element 22 is increased by a symmetric configuration.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A blade for a turbo machine comprising:
an airfoil body extending in a radial direction and including a suction side surface and a pressure side surface opposite to the suction side surface with respect to a circumferential direction extending across the radial direction; and
a snubber structure including a first snubber element protruding in the circumferential direction from the suction side surface of the airfoil body, and a second snubber element protruding in the circumferential direction from the pressure side surface of the airfoil body,
wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius.

2. The blade according to claim 1, wherein the first snubber element protrudes from the suction side surface by a first length, and the second snubber element protrudes from the pressure side surface by a second length, the first length being smaller than the second length.

3. The blade according to claim 2, wherein the first snubber element includes a first contact surface that faces away from the suction side surface and extends along an axial direction, the axial direction running transverse to the radial direction and the circumferential direction,
wherein the second snubber element includes a second contact surface that faces away from the pressure side surface and extends along the axial direction, and
wherein the first length and the second length are measured along a connection line that connects a center position of the first contact surface with respect to the axial direction and a center position of the second contact surface with respect to the axial direction.

4. The blade according to claim 3, wherein each of the first and second contact surfaces extends at least partially inclined with respect to the axial direction.

5. The blade according to claim 3, wherein a ratio of the first length to the second length is in a range between 0.7 and 0.9.

6. The blade according to claim 1, wherein a ratio of the first radius to the second radius is in a range between 0.2 and 0.8.

7. The blade according to claim 1, wherein the snubber structure and the airfoil body are integrally formed.

8. A blade assembly comprising:
a plurality of blades; and
a rotor disk to which the plurality of blades are coupled,
wherein each of the plurality of blades comprises:
an airfoil body extending in a radial direction and including a suction side surface and a pressure side surface opposite to the suction side surface with respect to a circumferential direction extending across the radial direction, and
a snubber structure including a first snubber element protruding in the circumferential direction from the suction side surface of the airfoil body, and a second snubber element protruding in the circumferential direction from the pressure side surface of the airfoil body,
wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius,
wherein the first snubber element includes a first contact surface facing away from the suction side surface, and the second snubber element includes a second contact surface facing away from the pressure side surface, and
wherein the first contact surface faces the second contact surface.

9. The blade assembly according to claim 8, wherein the first snubber element protrudes from the suction side surface by a first length, and the second snubber element protrudes from the pressure side surface by a second length, the first length being smaller than the second length.

10. The blade assembly according to claim 9, wherein the first snubber element includes the first contact surface that faces away from the suction side surface and extends along an axial direction, the axial direction running transverse to the radial direction and the circumferential direction,
wherein the second snubber element includes the second contact surface that faces away from the pressure side surface and extends along the axial direction, and
wherein the first length and the second length are measured along a connection line that connects a center position of the first contact surface with respect to the axial direction and a center position of the second contact surface with respect to the axial direction.

11. The blade assembly according to claim 10, wherein each of the first and second contact surfaces extends at least partially inclined with respect to the axial direction.

12. The blade assembly according to claim 10, wherein a ratio of the first length to the second length is in a range between 0.7 and 0.9.

13. The blade assembly according to claim 8, wherein a ratio of the first radius to the second radius is in a range between 0.2 and 0.8, and
wherein the snubber structure and the airfoil body are integrally formed.

14. A turbine comprising:
a blade assembly comprising a plurality of blades and a rotor disk to which the plurality of blades are coupled,
wherein each of the plurality of blades comprises:
an airfoil body extending in a radial direction and including a suction side surface and a pressure side surface opposite to the suction side surface with respect to a circumferential direction extending across the radial direction, and
a snubber structure including a first snubber element protruding in the circumferential direction from the suction side surface of the airfoil body, and a second snubber element protruding in the circumferential direction from the pressure side surface of the airfoil body,
wherein the first snubber element is connected to the suction side surface of the airfoil body by a concave curved first transition portion having a first radius, and the second snubber element is connected to the pressure side surface of the airfoil body by a concave curved second transition portion having a second radius, the first radius being smaller than the second radius, wherein the first snubber element includes a first contact surface facing away from the suction side surface, and the second snubber element includes a second contact surface facing away from the pressure side surface, and wherein the first contact surface faces the second contact surface.

15. The turbine according to claim 14, wherein the first snubber element protrudes from the suction side surface by a first length, and the second snubber element protrudes from the pressure side surface by a second length, the first length being smaller than the second length.

16. The turbine according to claim 15, wherein the first snubber element includes the first contact surface that faces away from the suction side surface and extends along an axial direction, the axial direction running transverse to the radial direction and the circumferential direction, wherein the second snubber element includes the second contact surface that faces away from the pressure side surface and extends along the axial direction, and wherein the first length and the second length are measured along a connection line that connects a center position of the first contact surface with respect to the axial direction and a center position of the second contact surface with respect to the axial direction.

17. The turbine according to claim 16, wherein each of the first and second contact surfaces extends at least partially inclined with respect to the axial direction.

18. The turbine according to claim 16, wherein a ratio of the first length to the second length is in a range between 0.7 and 0.9.

19. The turbine according to claim 14, wherein a ratio of the first radius to the second radius is in a range between 0.2 and 0.8, and wherein the snubber structure and the airfoil body are integrally formed.

20. The turbine according to claim 14, wherein the blade assembly forms part of a turbine section of the turbine, the turbine being a gas turbine.

* * * * *